United States Patent Office 2,977,396
Patented Mar. 28, 1961

2,977,396
PRODUCTION OF CONJUGATED DIOLEFINES

Herbert Muggleton Stanley, Tadworth, England, and Max Marin Wirth, Dollar, Scotland, assignors to British Hydrocarbon Chemicals Limited, London, England No Drawing. Filed Mar. 27, 1959, Ser. No. 802,308

Claims priority, application Great Britain Apr. 9, 1958

8 Claims. (Cl. 260—681)

The present invention relates to the catalytic production of conjugated diolefines by the reaction of aldehydes with mono-olefines.

The condensation of olefines with aldehydes is sometimes called the Prins reaction. Such condensation reactions are capable of yielding a variety of products such as meta-dioxanes, unsaturated alcohols, 1:3-diols or conjugated diolefines depending on the reaction conditions employed. The production of conjugated diolefines by the reaction between mono-olefines and aldehydes has been carried out by means of a two-stage process, and by a one-stage vapor phase process. A variety of catalysts has been proposed for use in the one-stage reaction, of which the best has appeared to be activated alumina. However, the yields of diolefine and efficiency of conversion of the starting materials have been low, owing apparently to the tendency of the diolefine to react with the aldehyde forming higher boiling condensation products, and also because of the decomposition of formaldehyde to give products such as carbon monoxide, so that the process has not represented an economic proposition on the industrial scale.

It is an object of the present invention to provide an improved process for the production of conjugated diolefines by the condensation of aldehydes and olefines in a single stage reaction in which improved yields and efficiencies are obtained.

According to the present invention, the process for the production of conjugated diolefines comprises reacting a lower mono olefine with formaldehyde or acetaldehyde at an elevated temperature in the vapor phase, in the presence as catalyst of a phosphate of an element from group II of the periodic table.

The catalysts which may be used in the process of the invention are phosphates of elements from group II of the periodic table. It is preferred to use cadmium phosphate. The catalysts may be prepared in any suitable manner, and may be deposited if desired on a support such as silica or alumina. The activity of the catalyst may decline slowly with continued use owing largely to carbon deposition on the catalyst surface, and may be restored by reactivating at an elevated temperature in air or oxygen-containing gases. However, the selectivity of the catalyst for production of diolefines remains at a high level. The catalysts, particularly cadmium phosphate, have the advantage of producing a diolefine product of appreciably higher purity than earlier catalysts. In particular, isoprene is made containing much less methylbutenes, which are difficult and expensive to separate from isoprene.

The olefines which are suitable for use in the process of the present invention are the lower mono-olefines having up to six carbon atoms, and particularly the tertiary olefines, i.e. olefines of the general formula $R_1R_2C=CHR_3$ where $R_1$ and $R_2$ are alkyl radicals, and $R_3$ is hydrogen or an alkyl radical. Olefines which isomerize under the reaction condition to give tertiary olefines of the type $R_1R_2C=CHR_3$ may also be used. It is particularly preferred to use isobutene, 2-methylbutene-2, and 2-methylbutene-1. The molar proportion of olefine is preferably at least equal to that of the aldehyde used, and is suitably between 1 and 20 moles per mole of aldehyde.

The aldehydes which can be used in the present invention are formaldehyde and acetaldehyde. The use of formaldehyde is preferred. Advantageously the formaldehyde is derived from industrial formalin which is a solution of 36 to 40% by weight of formaldehyde in water, usually containing some methanol. The formalin is vaporized and mixed with the lower mono-olefine before passing over the catalyst, and the steam in the gas mixture acts as a diluent. If desired inert diluents may be used, such as nitrogen, carbon dioxide or hydrocarbons such as the lower paraffins. The proportion of inert diluent in the reaction gas mixture can vary widely, for instance up to about 95% by volume.

The reaction may be carried out over a wide range of temperatures, for instance between 150° and 400° C. It is preferred to use temperatures in the range 250° to 350° C. The space velocity of the reactants over the catalyst may likewise vary and is suitably between 0.1 and 50 expressed as moles of aldehyde per litre of catalyst per hour. The optimum velocity will vary depending on the reaction temperature, and on the age and activity of the catalyst, and it is preferred to use the higher values of space velocities in the range set out with the higher temperatures, and vice versa.

For the process according to the invention the known methods of vapor phase catalysis may be employed. The catalyst may be a stationary or moving bed or a fluidized bed method may be used.

The diolefines can be recovered from the gaseous reaction product in any suitable manner, for instance by condensing the product followed by fractional distillation of the resulting liquid mixture. Unreacted olefines and formaldehyde can be recycled to the catalytic reaction.

A variety of conjugated diolefines can be produced by the process of the invention, including isoprene, from isobutene and formaldehyde.

The diolefines made in accordance with this invention are valuable chemical intermediates, for instance in the preparation of synthetic rubbers.

The process of the present invention is further illustrated with reference to the following example.

EXAMPLE

A catalyst consisting of cadmium phosphate deposited on silica was made up as follows:

Cadmium nitrate (7.4 parts by weight) was dissolved in 40 parts of water and this solution used to impregnate 80 parts of granular silica gel having an average pore diameter of 83 Angstrom units. The wet impregnated gel was exposed to ammonia vapors in order to precipitate cadmium hydroxide. The gel was then washed with water and dried for several hours at 110° C., then being impregnated with a solution of 2.3 parts of 90% orthophosphoric acid in 40 parts of water and calcined for 4 hours at 550° C. The catalyst contained 5 wt percent of cadmium phosphate.

A mixture of formaldehyde and steam, derived from formalin, and isobutene was passed over the catalyst at a temperature of 300° C., the reaction products being condensed and fractionally distilled to recover the isoprene. The reaction conditions and results over the first four hours of reaction are shown in the following table. The exceptional purity of the $C_5$ product, which contained only 2.4% of methylbutenes, is noteworthy.

Table

| | |
|---|---|
| Space velocity, moles total feed per litre catalyst per hour | 73 |
| Mole ratio, isobutene/formaldehyde | 3.1 |
| Formaldehyde conversion, percent | 58 |
| Isoprene formation, g./litre catalyst/hour | 91 |
| Efficiency of isoprene formation, percent | 36 |
| Methylbutenes in $C_5$ fraction, percent | 2.4 |

We claim:

1. The process for the production of conjugated di-olefines which comprises reacting a tertiary mono-olefine having 4 to 6 carbon atoms with an aldehyde selected from the group consisting of formaldehyde and acetaldehyde at an elevated temperature in the vapor phase, in the presence of cadmium phosphate as catalyst.

2. The process as claimed in claim 1 wherein the catalyst is deposited on a support.

3. The process as claimed in claim 1 wherein the tertiary mono-olefine is selected from the group consisting of isobutene, 2-methylbutene-2, and 2-methylbutene-1.

4. The process as claimed in claim 1 wherein the aldehyde starting material is a solution of formaldehyde in water.

5. The process as claimed in claim 1 wherein the molar proportion of tertiary mono-olefine to aldehyde is between 1:1 and 20:1.

6. The process as claimed in claim 1 wherein the reaction is carried out at a temperature between 150° and 400° C.

7. The process as claimed in claim 1 wherein the reaction is carried out at a temperature between 250° and 350° C.

8. The process as claimed in claim 1 wherein the space velocity of the reactants over the catalyst is between 0.1 and 50 mols of aldehyde per litre of catalyst per hour.

References Cited in the file of this patent
UNITED STATES PATENTS

| | | |
|---|---|---|
| 2,204,157 | Semon | June 11, 1940 |
| 2,350,485 | Arundale et al. | June 6, 1944 |
| 2,800,517 | Romanovsky et al. | July 23, 1957 |